United States Patent Office 3,709,862
Patented Jan. 9, 1973

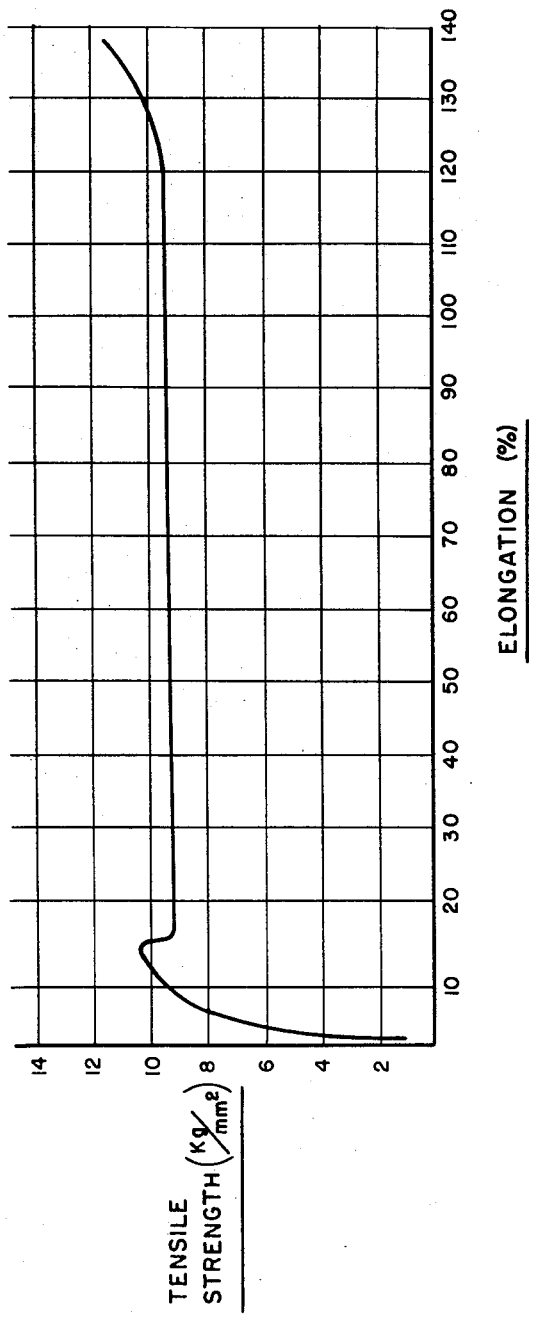

3,709,862
PROCESS FOR THE PREPARATION OF
POLYIMIDES
Muneyoshi Minami, Otsu-shi, Japan, assignor to Toray
Industries, Inc., Tokyo, Japan
Filed Sept. 12, 1969, Ser. No. 857,492
Claims priority, application Japan, Sept. 13, 1968,
43/65,531
Int. Cl. C08g 20/32
U.S. Cl. 260—47 CP  3 Claims

ABSTRACT OF THE DISCLOSURE

A novel class of polyimide polymers are provided which are obtained by reacting a functional derivative of a tricarboxylic or a tetracarboxylic acid such as an anhydride or acyl halide with 1,3-phenylene bis-(p-aminophenyl) ether or a mixture of amines containing 1,3-phenylene bis-(p-aminophenyl) ether. The novel polyimide polymers of this invention have excellent heat resistance and in addition have improved flexibility and elongation in comparison with known polyimide polymers. The polymers of this invention are especially useful for forming shaped articles, such as insulation tape or as enamel coatings for electric wire.

BACKGROUND OF THE INVENTION

(1) Field of the invention

This invention relates to certain novel heat resistant polymers and to the process for the preparation of these polymers. More particularly, this invention is concerned with heat resistant polymers which have in the main chain as the structure unit an imide ring.

(2) Description of the prior art

Polymers having as the structure units in the main chain an imide ring and another hetero ring, for example, imidazole, oxazole, thiazole, quinazoline, oxazinone, imidazopyrrolone and isoindoloquinazoline ring etc. are known to have excellent heat resistant properties. However, the known polymers having only imide rings and polymers having both imide rings and hetero rings are excessively stiff. When these known polymers are made into films, applied enamel coatings on wire or formed into fibers, they exhibit poor flexibility and have practically no elongation.

Diaminodiphenylether has been suggested for use as a diamine reactant for the preparation of heat resistant polyimide high polymers. As compared with other commonly employed aromatic diamines, for example, phenylene diamine, benzidine, and diaminodiphenylsulfone, when diaminodiphenylether is employed polymers are obtained which have improved flexibility and elongation and excellent adherability. Polymers of this type are used as films and as enamel coating for electric wire. However, even when diaminodiphenylether is employed as the diamine reactant the physical properties of the film and enamel coating are not completely satisfactory. When the film is used in the form of a tape and wound around a conductor, it tends to form folds and voids because of the inherent stiffness of the polymer. When the polymers are used as enamel coatings on rectangular wire and the coated wire is twisted and bended flatwise or edgewise to form an armature coil, cracks occur on the outer side which are placed under a large tension. The cracks in the coating must then be repaired.

It is an object of this invention to overcome the aforementioned problems and difficulties encountered in the prior art.

It is a further object of this invention to provide heat resistant polymers having improved flexibility and elongation, and especially exhibiting so-called knecking phenomenon in stretching.

It is a still further object of this invention to provide a process for producing said polymers.

Other objects and advantages of the present invention will become apparent from a further reading of the specification and the subjoined claims.

SUMMARY OF THE INVENTION

The objects of this invention have been achieved by providing polyimide polymers of improved characteristics, which are obtained by polymerizing together a functional derivative of a tricarboxylic acid or tetracarboxylic acid such as an anhydride or acyl halide with a novel diamine 1,3 - phenylene bis - (p-aminophenyl) ether or a mixture of amines containing 1,3-phenylene bis-(p-aminophenyl) ether, and dehydrating and ringclosing the polymerization product.

BRIEF DESCRIPTION OF THE DRAWING

FIG. 1 is a graphic illustration of the tensile strength-elongation curve of one of the polymers included within the scope of the present invention.

DESCRIPTION OF THE PREFERRED EMBODIMENTS

It has been found that when 1,3 - phenylene bis-(p-aminophenyl) ether is employed as the amine reactant in place of the amines previously used in the prior art as diamine reactants for the production of polyimide polymers that quite surprisingly the resulting polymers, in addition to having excellent heat resistance, also exhibit superior flexibility and elongation properties. Furthermore, it has been found that certain triamines and tetramines can be used in admixture with the 1,3 - phenylene bis-(p-aminophenyl) ether to further improve the adherability and processability for various shaped articles of the polymers.

The diamine, 1,3 - phenylene bis - (p - aminophenyl) ether, which is employed as one of the reactants in the preparation of the polymers of this invention is synthesized by adding alkali to a mixture of resorcinol and 4-nitrochlorobenzene, and reacting these materials together whereby 1,3 - phenylene - 4',4" - dinitrodiphenyl ether is obtained. This product is then reduced in the presence of an ordinary metal catalyst to provide the corresponding diamino ether.

The polymers of the present invention are prepared by reacting 1,3 - phenylene bis - (p - aminophenyl) ether or mixtures thereof with certain other amines with a tetracarboxylic dianhydride and/or a tricarboxylic monoanhydride acid halide represented by the following general Formulae I and II:

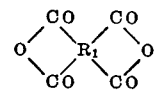

I

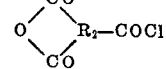

II wherein $R_1$ is a tetravalent group having at least 4 carbon atoms, which may be an aliphatic, aromatic, alicyclic, heterocyclic radical or a group consisting of several of said radicals and preferably is aromatically unsaturated; most preferably the group $R_1$ is a carbocyclic aromatic radical having at least 6 and preferably not more than 15 carbon atoms; $R_2$ is a trivalent group having at least 3 carbon atoms, which may be aliphatic, aromatic, alicyclic, heterocyclic group or a group consisting of several of said radicals and preferably is aromatically unsaturated carbocyclic and containing at least 6 and preferably not more than 15 carbon atoms.

The initial reaction in the process of the present invention is the formation of a polyamide. The reaction product is then dehydrated and rings are closed to obtain desired polyimide or polyimide amide product. The reaction is believed to proceed as shown by the following reaction formulae when a mixture of a tetracarboxylic acid dianhydride of Formula I and a tricarboxylic acid monoanhydride acyl halide of Formula II are employed In addition, attention is directed to adducts with certain amines which are represented by the following general Formula III.

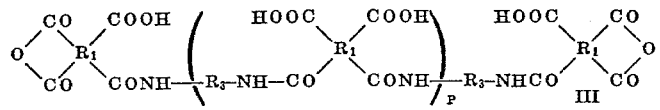

wherein $p$ is a whole number preferably from 0–4 and $H_2N-R_3-NH_2$ is a group represented by one of the following general Formulas IV–XXXII.

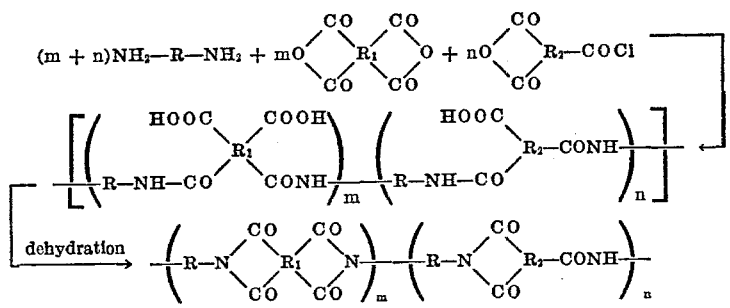

wherein $NH_2-R-NH_2$ stand for 1,3-phenylene bis-(p-aminophenyl) ether; $R_1$ and $R_2$ have the meaning assigned above; $m$ and $n$ is number of units in polymer.

Certain of the preferred tetracarboxylic dianhydride for employment in this invention are shown in the working example. In addition, specific attention is directed to compounds such as pyromellitic dianhydride, 2,3,6,7-naphthalene tetracarboxylic dianhydride, 1,4,5,8-naphthalene tetracarboxylic dianhydride, 3,3',4,4'-benzanilide tetracarboxylic dianhydride, 3,3',4,4'-diphenylsulfonetetracarboxylic dianhydride, 3,3',4,4'-diphenyltetracarboxylic dianhydride, 2,6,2',6'-diphenyltetracarboxylic dianhydride, 3,3',4,4' - diphenylpropane tetracarboxylic dianhydride, pyrazine-2,3,5,6-tetracarboxylic dianhydride, 3,3',4,4'-diphenylether tetracarboxylic dianhydride, 3,3',4,4'-benzophenone tetracarboxylic dianhydride, 1,2,3,4-cyclopentane tetracarboxylic dianhydride, 1,2,4,5-cyclohexane tetracarboxylic dianhydride, 1,2,3,4-butane tetracarboxylic dianhydride, and 1,2,4,5-pentane tetracarboxylic dianhydride, etc.

Certain representative examples of tricarboxylic anhydride acid halide are shown in the example and additional attention is directed to compounds such as monoanhydride acid halide of tricarboxylic acid such as trimellitic acid, 3,4,4' - diphenylether tricarboxylic acid, 1,4,5-naphthalene tricarboxylic acid, 2,3,6-naphthalene tricarboxylic acid, 2,3,5-pyrazine tricarboxylic acid, 1,2,4-quinaline tricarboxylic acid, 1,2-cyclohexane tricarboxylic acid, 1,2,4-butane tricarboxylic acid, etc.

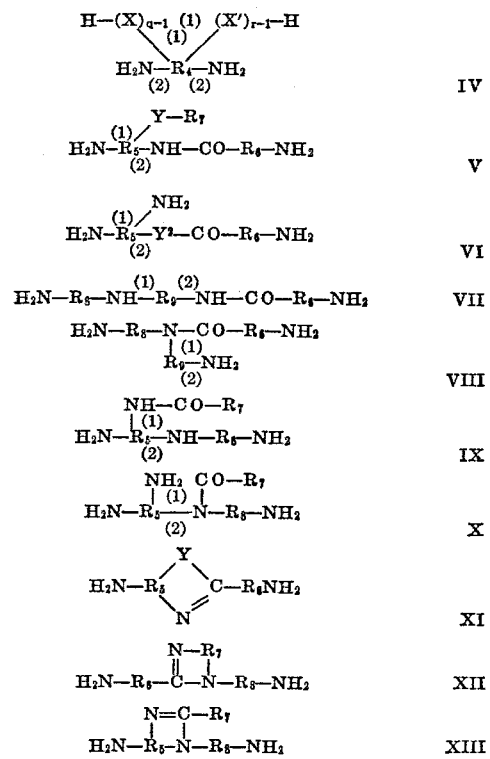

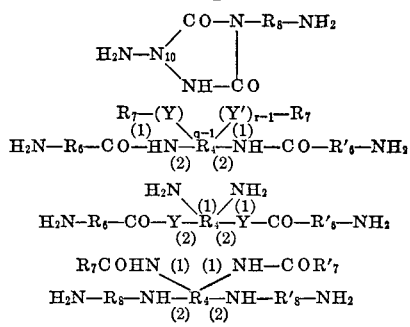

XIV

XV

XVI

XVII

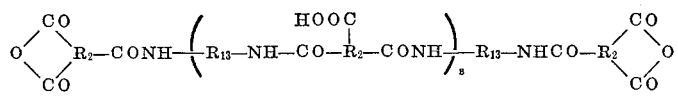

XXXIII

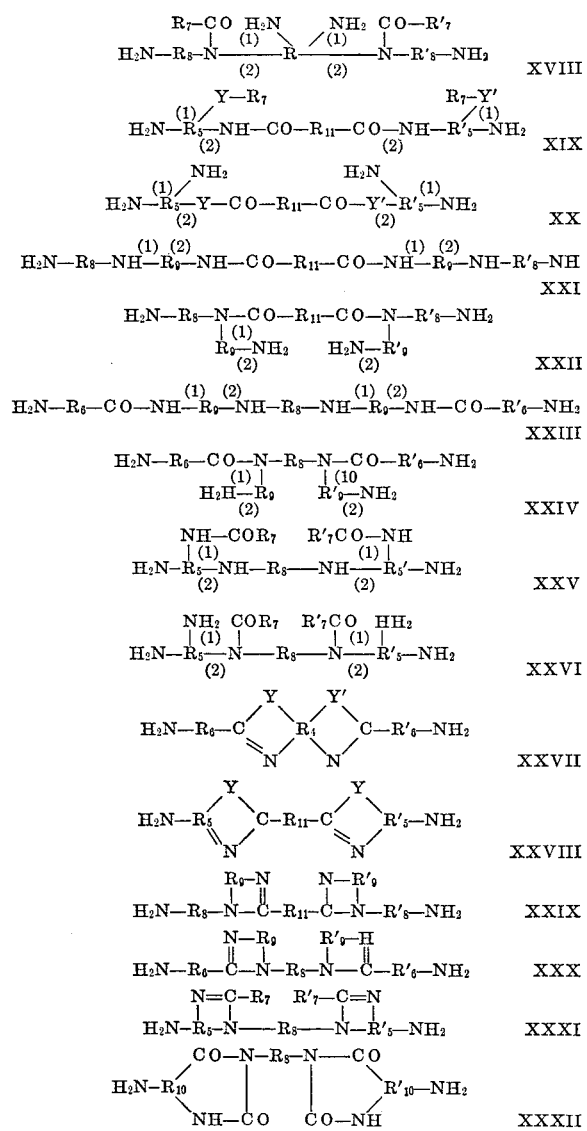

wherein X and X' are the same or different and

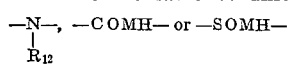

Y and Y' are the same or different and

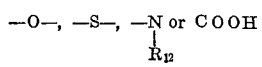

$R_4 \sim R_{12}$ and $R'_5 \sim R'_{10}$ are the same or different monovalent, divalent, trivalent or tetravalent group as defined above for $R_1$ and as to $R_7$ and $R_{12}$ they also may be H and especially, if the formation of a certain closed ring is retarded, either one or both of them should be H and $R_{11}$ also may be nil; bond (1) and (2) occupy the vicinal positions which is enabled to form a closed ring; q and r are the same or different and are whole numbers from 1 and 2.

As another kind of tetracarboxylic dianhydride which may be employed attention is directed to the adducts of the following general Formula XXXIII derived from tricarboxylic anhydride and certain amines.

wherein s is preferably 0–4, $R_2$ has the meaning assigned above and $H_2N—R_{13}—NH_2$ is a group represented by one of the above mentioned amine of Formulas IV–XXXII and a diamine of the following general Formula XXXIV

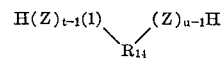

XXXIV wherein $R_{14}$ is a group as defined above for $R_1$, Z is —O—, or —S—, bond (1) and (2) occupy the vicinal positions and t and u are the same or different and each is a whole number from 1 and 2.

Specific examples of suitable amines of the Formulas IV–XXXII and XXXIV are for example paraphenylene diamine,
methaphenylene diamine,
4,4'-diaminodiphenyl methane,
4,4'-diaminodiphenyl propane,
benzidine,
4,4'-diaminodiphenyl ether,
4,4'-diaminodiphenyl sulfide,
3,3'-diaminodiphenylsulfone,
1,5-diaminonaphthalene,
guanamine,
benzoguanamine,
2,6-diamino pyridine,
1,4-diaminocyclohexane,
4,4'-diaminodicyclohexylmethane,
1,3-xylylene diamine,
1,2-ethylene diamine,
1-mercapto-2,4-diaminobenzene,
1-hydroxy-2,4-diaminobenzene,
2,5-dimercapto-1,4-diaminobenzene,
3,3' - dimercapto-4,4'-diaminodiphenylether,
3,3'-dihydroxybenzidine,
3,3'-diaminobenzidine,
1,2,4-triaminobenzene,
2,4,5-triaminotoluene,
3,4,3'-triaminodiphenylsulfone,
3,4,4'-triaminodiphenylether,
3,4,3'-triaminobenzanilide,
3,4,3'-triaminobenzophenone,
2,3,7-triaminoacridine,
1,4,5-triaminonaphthalene,
3,4',3',4'-tetraaminodiphenylmethane,
3,4,3',4'-tetraaminodiphenylether,
1,4,5,8-tetraaminonaphthalene,
3,3'-dicarboxybenzidine,
3,3'-dicarbamoyl-4,4'-diaminodiphenylmethane,
3,3'-disulfamoyl-4,4'-diphenylthioether,
3,5'-diamine-2'-mercaptobenzanilide,
4,5'-diamino-2'-hydroxybenzanilide,
3,5'-diamino-2'-carboxybenzanilide,
2-(4'-aminophenyl)-6-aminobenzimidazole, 2,(3′-aminophenyl)-6-aminobenzoxazole,
2-(4′-aminophenyl)-6-aminobenzoxazinone,
3-(4′-aminophenyl)-6-aminoquinazolinedione,
2-(p-aminobenzamido)-4-amino-diphenylamine,
2-(p-aminobenzamido)-1,4-diaminobenzene,
2-(p-aminobenzamido)-4-amino-1-propoxybenzene,
2-(p-aminobenzamido)-4-aminophenol,
p-aminobenz-2′,4′-diaminodiphenylamide,
2,4-diaminophenyl-thio-p-aminobenzoate,
2-(p-aminobenzamido)-4′-aminodiphenylamine,
4-(p-aminophenoxy)-benz-2′,4″-diaminodiphenylamide,
p-aminobenz-2,4′-diaminodiphenylamide,
2-benzamido-4,4′-diaminodiphenylamine,
2-formamido-4,4′-diaminodiphenylamine,
benz-2,4,4′-triaminodiphenylamide,
1,2-di-p-aminophenylbenzimidazole,
1-p-aminophenyl-5-aminobenzimidazole,
4,4′-di-(m-aminobenzamido)-3,3′-mercapto-diphenyl,
4,4′-di-(p-aminobenzamido)-3,3′-diaminodiphenylether,
2,5-di-(p-aminobenzamido)-1,4-dihydroxybenzene,
2,5-di-(m-aminobenzamido)-1,4-diaminobenzene,
2,5-di-(N-phenyl-p-aminobenzamido)-1,4-diaminobenzene,
2,5-diaminophenylene-bis-1,4-thio-p-aminobenzoate,
3,3′-di-p-aminophenylcarboxy-4,4′-diaminodiphenyl,
4,4′-(p-aminophenylamino)-3,3′-i-nicotinamido-diphenyl,
2,5-di(N-phenyl-p-aminobenzamido)-1,4-diamino-
4,4′-N-(p-aminophenyl)-benzamido-3,3′-diaminobenzene,
terephthal-bis-2,4-diaminoanilide,
isophthal-bis-2-N-mentylamino-5-aminoanilide,
terephthal-bis-2-hydroxy-5-aminoanilide,
oxal-bis-2,4-diaminoanilide,
terephthal-bis-2,4-diaminodiphenylamide,
bis-(2,4-diaminophenyl)-oxalate,
isophthal-bis-2-(p-aminophenylamino)anilide,
oxal-N-2-(p-aminophenylamino)-phenyl-N′-8-(p-aminophenylamino)-1-naphthpyl-amide,
terephthal-bis-2,4-diaminodiphenylamide,
N,N′-1,4-phenylene-bis-2′-(p-aminobenzamido)-aniline,
N,N′-1,4-phenylene-bis-(p-aminobenz)-2′-aminoanilide,
N,N′-1,4-phenylene-bis-4′-amino-2′-formamido-aniline,
N,N′-2,6-pyridylene-4′-amino-2′-formamido-aniline,
N,N′-1,3-phenylene-bis-benz-2′,4′-diaminoanilide,
syn-benz-bis-(2-aminophenyl)-oxazole,
6,6′-bis-2-(p-aminophenyl)-benzoxazolyl,
6,6′-bis-1-phenyl-2-(p-aminophenyl)-benzimidazolyl,
1,4-phenylene-bis-6′-amino-2′-benzthiazole,
1,4-phenylene-bis-6′-amino-2′-benzoxazole,
1,4-phenylene-bis-1′-(p-aminophenyl)-2′-benzimidazole,
1,4-phenylene-bis-1′-(p-aminophenyl)-2′-benzimidazole,
1,4-phenylene-bis-2′-(p-aminophenyl)-1′-benzimidazole,
1,4-phenylene-bis-2′-phenyl-5′-amino-1′-benzimidazole,
2,4-toluylene-bis-6-amino-3-quinazoline etc.

Various combinations of reaction steps can be employed to provide the polyamide polymer which is a precursor to the polyimide polymer of this invention. One of more adducts of the type defined by general Formulae III and XXXIII can be reacted with 1,3-phenylene bis-(p-aminophenyl) ether or with a mixture of 1,3-phenylene bis-(p-aminophenyl) ether and one or more of the amines defined by the general Formulae IV–XXXII. It is also possible to prepare an adduct of one of the anhydride compounds of Formula I or II with the amine represented by Formulae IV–XXXII or XXXIV and then react this with the 1,3-phenylene bis-(p-aminophenyl) ether. Furthermore it is also possible to prepare an adduct of 1,3-phenylene bis-(p-aminophenyl) ether and an anhydride of Formula I or II and then further react the adduct with an amine of Formulae IV–XXXI. Other variations are of course possible and are likewise included within the scope of this invention.

The so-obtained precursor polyamide polymer are ordinarily heated and converted to a ring-closed polymer, which has imide and other heterocyclic groups. And then, the polyimide polymer from said acid reactant of Formulas I and II and amine reactant of Formula IV–XXXII and XXXIV and 1,3-phenylene bis-(p-aminophenyl) ether is to have following final heterocyclic group as other than imide and amide group.

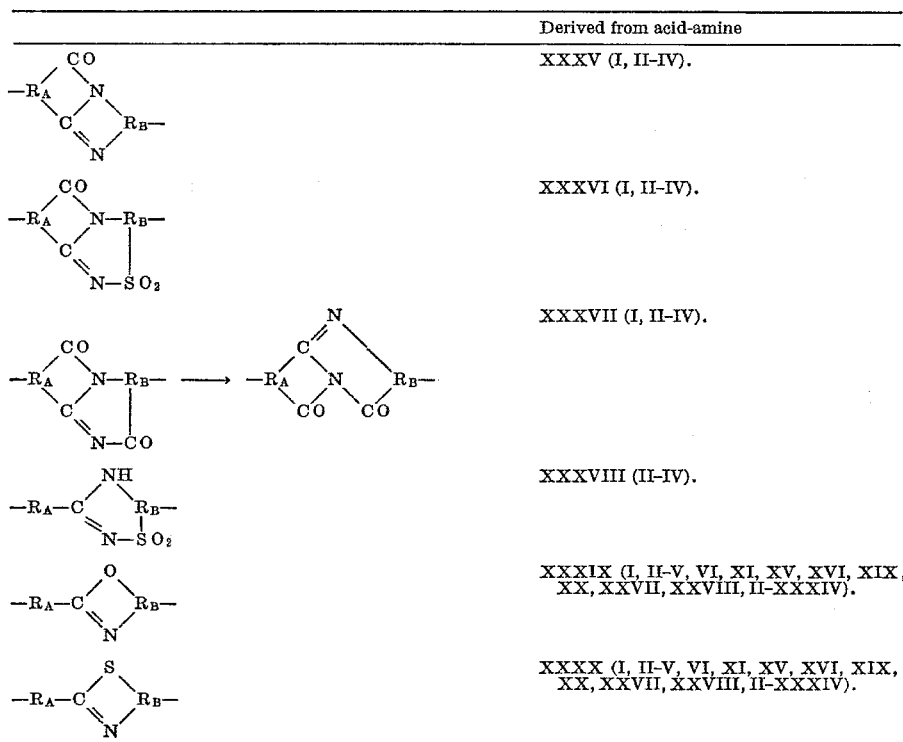

| | Derived from acid-amine |
|---|---|
| 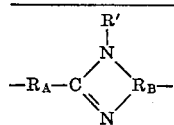 | XXXXI (I, II-V, VI, XI, XV, XVI, XIX, XX, XXVII, XXVIII, II-IV). |
| 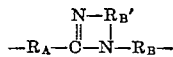 | XXXXII (I, II-VII, VIII, XII, XXI, XXII, XXIII, XXIV, XXIX, XXX). |
| 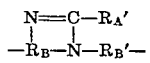 | XXXXIII (I, II-IX, X, XIII, XVII, XVIII, XXV, XXVI, XXXI). |
| 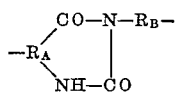 | XXXXIV (I, II-IV, XXXII). | wherein $R_A$, $R_B$ and $R_B'$ are the same or different monovalent tetravalent group as defined above for $R_1$.

Concerning to the polyimide polymer derived from the anhydride of Formula II, especially the aromatic, for example trimellitic anhydride acid chloride, the most preferable kind of tetracarboxylic dianhydride of Formula XXXIII is those prepared with amine of Formula IV or XXXIV, therefore, by heating and ring-closing of the diamine-adduct-polyamide acid prepolymer, the obtained final polyimide polymer shows the most high heat-stability exhibiting no amide bond, namely which is finally ring-closed and forms bond of high heat-resistant imidazole, oxazole or thiazole etc.

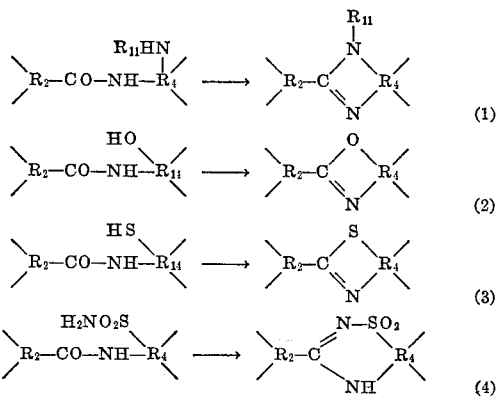

As for the polyimide polymer derived from the amine of Formula IV with tetracarboxylic dianhydride of Formula I, III or XXXIII, the finally ring-closed structure becomes as follows, forming the complicated heterocyclic.

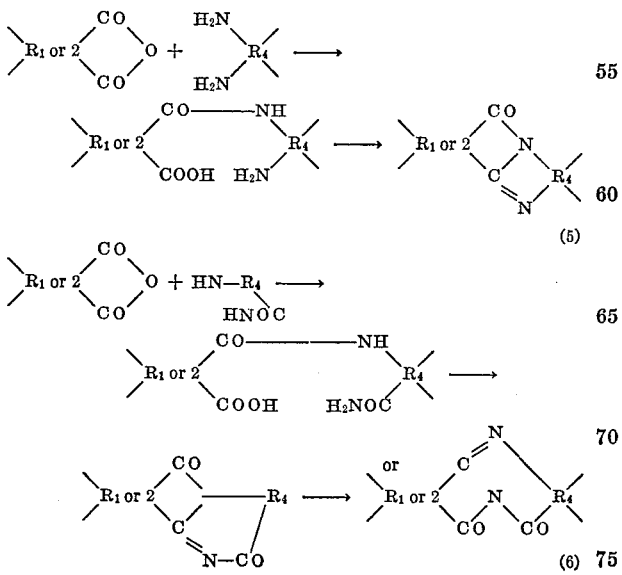

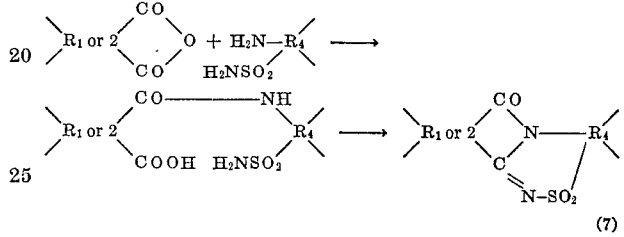

As mentioned above the use of 1,3-phenylene bis-(p-aminophenyl) ether a diamine reactant results in the final polyimide polymer having substantially improved properties. As compared with the known simple polyimide, especially those which contain other types of heterocyclic rings, the polymer of the present invention exhibits superior flexibility and elongation. Other typical physical properties are also improved especially the tensile strength versus elongation. The tensile strength-elongation curve shows a yield point at an early stage. When this polyimide polymer is used as enamel coating of a rectangular wire or tape film, the polymer extends and exhibits a so-called necking phenomenon. It can therefore be used advantageously without bringing about undesirable formation of folds or voids on taping of wire with film or abnormal strain on twisting and bending the enamelled wire or taped wire in the formation of coil, whereby produced strain is released by necking phenomenon.

The case in which 1,3-phenylene bis-(p-aminophenyl) ether show especially remarkable results is when it is used together with an amine of Formula IV. When an amine of Formula IV is used alone the final ring closed polymer structure is an imidazopyrrolone, isoindoloquinazolone, etc. depending on the particular amine employed and containing structure units of one of the following Formulae (XXXV, XXXVI and XXXVII above.)

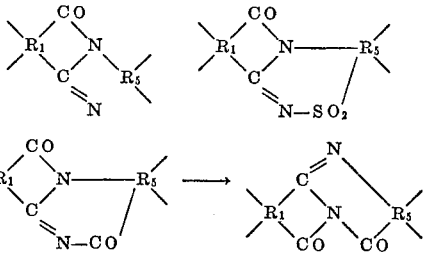

The films obtained using only an amine of Formula IV are very stiff and poor in flexibility and the percent elongation is below 10%. However, when 1,3-phenylene bis-(p-aminophenyl) ether is conjointly used a film is obtained which is flexible and the elongation is easily increased up to 50-100% or more.

The other advantages of using a combination of amines, especially the triamines and tetraamines of Formula IV, is particularly noticeable in the manufacture of films. Relatively thin films, for example a few microns thick having satisfactory physical properties can be obtained using relatively short cure times in case of a polyimide obtained by the polymerization of 1,3-phenylene bis-(p-aminophenyl) ether alone with a tetracarboxylic dianhydride of Formula I and then closing the ring by heating. However when the above polyimide polymer is made into relatively thick films, for example a 50–100 microns thick, the step of heating the film to remove the solvent considerably reduces the degree of polymerization which results in formation of brittle film. However, the use of a blend of amines of Formula IV containing several mol percent or more in addition to the 1,3-phenylene bis-(p-aminophenyl) ether results in a polymer which can readily be formed into tenacious thick films which have a high degree of flexibility and folding endurance.

In order to prepare a polyamide which is the precursor for the polyimide polymer of this invention at least one kind of tetracarboxylic dianhydride and/or tricarboxylic monoanhydride acid halide shown by the above general formulae is reacted with 1,3-phenylene bis-(p-aminophenyl) ether. The polymerization reaction is preferably conducted by mixing the two reactants in an inert solvent in which at least one of these reactants dissolves.

The reaction temperature and reaction time vary depending upon the reactants and the solvent employed. It is preferable to carry out the reaction at a temperature below 200° C. for a time sufficient to substantially complete the reaction and produce the above described polyamide polymer. Because this reaction will take even at a low temperature, the reaction may be carried out with cooling, with a reaction temperature of from −20° C. to 100° C. being preferably used. Normally the reactants are used in equimolar ratio. It is also possible to use an excess of either reactant, however excess amounts of more than 5% should be avoided in that low molecular weight polymers may be obtained. In order to control the molecular weight, a blocking agent of the type normally employed in the reaction of this type such as aniline and phthalic anhydride may also be added.

The reaction medium used in the polymerization reaction should be inert with respect to the starting materials and preferably a solvent for at least one of the starting materials. Solvents N,N-dialkyl acid amides for example dimethyl formamide, dimethyl acetamide, diethyl acetamide, N-methyl-2-pyrrolidone and N-methyl caprolactam are preferably used. However, solvents such as dimethyl sulfoxide, tetramethyl urea, pyridine, dimethyl sulfone, hexamethyl phosphoramide, tetramethylene sulfone, formamide, N-methyl formamide, and γ-butylolactone may also be used. The solvents are used alone or in admixtures with other solvents including such poor solvents as benzenes, toluene, nitrobenzene, chlorobenzene, dioxane, cyclohexanone, etc.

The amount of the polymerization solvent that is used can be varied insofar that an amount sufficient to form a good polymerization system is used. Normally when the solvent is used in an amount of about 5% to 30% of the solid content, high molecular weight polyamides are obtained.

The reaction product may consist of only polyamides or it may also contain partially dehydrated closed ring polymers. Because of its excellent processability, the polyamide reaction product may be formed into the desired configuration at this stage and the shaped solid polyamide thereafter dehydrated.

The polyamide reaction product obtained from the initial polymerization reaction may be used as such or after substitution the solvent use the solvent in spinning, film making or as a coating on electric wire.

Thereafter, the polyamide is dehydrated and converted into the imide polymer of this invention which consists mainly of imide or another closed ring heterocyclic structure. By this conversion polymers having substantially improved properties are obtained.

The dehydration reaction is performed according to well known procedures for intramolecular dehydration. For example the polyamide product can be treated at a sufficiently high temperature to cause a dehydration, or dehydrated with an agent such as carboxylic anhydride. The temperature at which the dehydration treatment is normally conducted is above 100° C., and more preferably above 150° C. with the range of 200–400° C. being the most preferred range. The dehydration can be conducted in the air, however, it is preferable that the dehydration be conducted in a non-oxidizing atmosphere such as under a reduced pressure or in an inert gas atmosphere. The preferred dehydrating agents are, as noted above, carboxylic anhydrides such as acetic anhydride, propionic anhydride and benzoic anhydride. When these dehydration agents are used in the presence of a basic substance such as pyridine and quinoline, the dehydration effect is substantially increased. The polymer of the present invention obtained after dehydration has excellent heat and oxidation resistance. It is most useful as an electric insulation material or to make shaped articles. The polymers are useful in the form of films, coatings on electric wire, laminates, paints and adhesives, especially when the final product will be used at a high temperature.

The following examples are given by way of illustration and are not intended to limit the scope of the subjoined claims. All percentages unless otherwise noted are percent by weight, not percent by volume.

Hereinafter, inherent viscosity ($\mu_{inh}$) is expressed by $$\text{Inherent viscosity} = \frac{\text{Natural logarithm}\left(\frac{\text{Flow time of solution}}{\text{Flow time of solvent}}\right)}{\text{Concentration}}$$

The concentration referred to in the examples is the concentration of the polymer in the solution as expressed by number of grams of the polymer per 100 ml. of the solution. The ordinary viscosity referred to in the examples is measured at 0.5 g./100 ml. at 30° C. in N-methyl pyrrolidone.

EXAMPLE 1

A closed three-necked flask equipped with a stirrer was charged with 10.906 g. (0.05 mol) of pulverized pyromellitic anhydride obtained by recrystallizing and purifying from acetic anhydride. 12 g. (about 10% of the final total amount) of tetrahydrofuran was added to make slurry. 9.345 g. (0.032 mol) of 1,3-phenylene bis-(p-aminophenyl) ether was placed in a 100 cc. conical flask and 81 g. of dimethyl acetamide was added in which 1,3-phenylene bis-(p-aminophenyl) ether was dissolved. This mixture was then added to the above slurry with stirring at room temperature. The reaction liquid was not cooled. The reaction temperature rose to 45–50° C. 3.875 g. (0.018 mol) of 3,4,4′-triaminodiphenylether was placed in a 250 cc. conical flask and 15.5 g. of dimethyl acetamide was added into which the 3,4,4′-triaminodiphenyl ether was dissolved. This mixture was added to the reaction mixture 3 minutes after the first addition of 1,3-phenylene bis-(p-aminophenyl) ether with vigorous stirring in about 10 seconds. The viscosity of the solution rose. The stirring was continued and the solution was left to cool. During this period tetrahydrofuran was removed under reduced pressure. And a polymer solution having a concentration of 20% and a viscosity of 390 poises at 33° C. was obtained. The degree of polymerization of the polymer at the first stage of adding 1,3-phenylene bis-(p-aminophenyl) ether was $\mu_{inh}$. 0.097 and at the final stage after adding 3,4,4′-triaminodiphenyl ether was $\mu_{inh}$. 1.3.

The polymer solution was spread on a glass plate so that the thickness of the finally obtained film would be about 70 microns. At first the solution was left to stand at 60–70° C. under a reduced pressure to evaporate as possible. It was then cured at 250° C. for 1 hour to obtain a film. This film was cut into strips 5 mm. wide and the tensile strength and the elongation were measured by an autograph. The tensile strength-elongation curve is shown in FIG. 1. At an early stage a yield point appeared, thereafter the curve extended while the sample showed a so-called necking phenomenon and finally broke. The tensile strength at the yield point was 10.2 kg./cm.² and the elongation thereat was 13%, the final tensile strength at breakage was 11.2 kg./cm.² and the elongation was 136%.

EXAMPLE 2

4.673 g. (0.016 mol) 1,3-phenylene bis-(p-aminophenyl) ether was dissolved in 50 g. of a 1:4 mixed solution of dimethyl acetamide and N-methyl pyrrolidone and the resulting solution was cooled to −15° C. 4.363 g. (0.02 mol) of finely pulverized pyromellitic anhydride was added with care taken so that no lumps formed. The temperature rose to about 0° C. and a uniform solution was obtained. The reaction was continued in an ice water bath. After about 40 minutes, 0.861 g. of (0.004 mol) of 3,4,4'-triaminodiphenylether dissolved in 2 g. of mixed solvent was added with vigorous stirring. The stirring was continued for about 2 hours until completion of the reaction. A solution having a concentration of 15% and a viscosity of 85 poises at 30° C. was obtained. The degree of polymerization of this solution $\mu_{inh}$ was 1.2. A 70 micron thick film was made from this solution as described in Example 1 and the tensile strength and the elongation were measured. The tensile strength-elongation curve had approximately the same shape as is shown in FIG. 1. The tensile strength at the yield point was 11.8 kg./cm.² and the elongation was 15%. The tensile strength at the final breaking time was 124 kg./cm.² and the elongation was 128%.

EXAMPLE 3

4.093 g. (0.014 mol) of 1,3-phenylene bis-(p-aminophenyl) ether and 1.2716 g. (0.006 mol) of 3,4,4'-diaminodiphenylether were dissolved in 87.3 g. of a 1:1 mixed solution of dimethylacetamide and N-methyl pyrrolidone. The resulting mixed solution cooled with water (20° C.) and 4.41 g. (0.0198 mol) of pyromellitic anhydride was added gradually. The addition was completed in about 10 minutes. Thereafter the mixture was stirred for 3 hours. A solution was obtained having a concentration of 10% and a viscosity of 63 poises at 30° C. The $\mu_{inh.}$ of this polymer was 1.5. A film was made from this solution and the tensile strength and the elongation were measured. The tensile strength-elongation curve was similar to that shown in FIG. 1. The tensile strength at the yield point was 11.1 kg./cm.² and the elongation was 14%. The final tensile strength at breakage was 10.8 kg./cm.² and the elongation was 102%.

EXAMPLE 4

Example 2 was repeated with the exception that instead of 3,4,4'-triaminodiphenylether, 0.921 g. (0.004 mol) of 3,4,3',4'-tetraaminodiphenylether was used in carrying out polymerization. The obtained solution had a concentration of 15% and a viscosity of 92 poises at 30° C. A 70 micron thick film made from said solution was flexible, in its tensile-elongation curve similarly a yield point which appeared at an early stage. The tensile strength at the yield point was 12.4 kg./cm.², the elongation thereat was 13%. The tensile strength at breakage was 13.0 kg./cm.² and the elongation was 97%.

EXAMPLE 5

2.421 g. (0.01 mol) of 4-aminobenz-2'-hydroxy-5'-aminoanilide was dissolved in 55 g. of dimethyl acetamide and the resulting solution was cooled in an ice salt bath. While stirring 4.362 g. (0.02 mol) of pyromellitic anhydride was gradually added in order to keep the temperature at −5° C. This was followed by the addition of 2.920 g. (0.01 mol) of 1,3-phenylene bis-(p-aminophenyl) ether. The reaction temperature was gradually raised to about 15° C., the stirring was continued for about 4 hours. The solution thus obtained had a concentration of 15% and a viscosity of 36 poises at 30° C. While the final stage was conducted in a nitrogen stream, the temperature was gradually raised to 350° C. and maintained at this temperature for 30 minutes, a 30 micron thick film was made. The film was flexible and its tensile strength-elongation curve similarly a yield point appeared at an early stage. The tensile strength at the yield point was 12.2 kg./cm.² and the elongation was 13%. The tensile strength at breakage was 12.8 kg./cm.² and the elongation was 91%. In comparison, a film made from a polymer obtained from the equimolar parts of 4-aminobenz-2-hydroxy-5-aminoanilide and pyromellitic anhydride was hard, poor in softness and in its tensile strength-elongation curve did not exhibit a yield point.

EXAMPLE 6

Example 5 was repeated with the exception that the temperature of the first stage of the reaction was −15° C. and 2.153 g. (0.01 mol) of 3,4,4'-triaminodiphenylether was dissolved in 55 g. of dimethyl acetamide to which 0.375 g. (0.02 mol) of trimellitic anhydride chloride was gradually added. The stirring of the mixture was continued for about 30 minutes, and to a mixture of 0.201 g. (0.02 mol) of triethylamine and 2.920 g. (0.01 mol) of 1,3-phenylene bis-(p-aminophenyl) ether was gradually added. Thereafter, the temperature was gradually raised and at 10° C. the stirring was continued for several hours. The solution obtained had a concentration of 10% and a viscosity of 7 poises at 30° C. The ring closing was carried out in a nitrogen stream. The temperature was gradually raised to 350° C. and maintained at this temperature for 30 minutes. A 30 micron thick film was prepared as above which was soft and whose tensile strength-elongation curve showed a yield point at an early stage. The tensile strength at the yield point was 11.2 kg./cm.² and the elongation was 14%. The final tensile strength at breakage was 11.5 kg./cm.² and the elongation was 102%. In comparison, in the foregoing instead of 1,3-phenylene bis-(p-aminophenyl) ether an equimolar amount of 4,4'-diaminodiphenylether was used, and a film was made from the polymer obtained. This film was hard and in its tensile strength-elongation curve had no yield point.

The following is claimed:

1. The process for the preparation of a polyimide comprising the step of condensing a dianhydride selected from the group consisting of

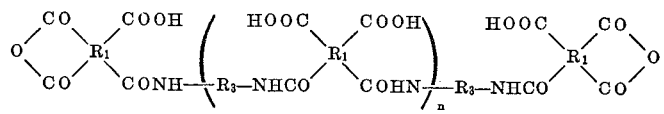

and

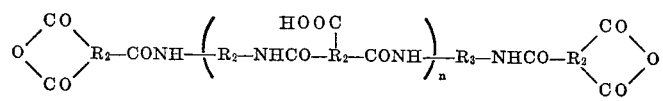

wherein $R_1$ is an aliphatic, alicyclic or heterocyclic radical containing 4–15 carbon atoms or an aromatic hydrocarbon radical containing 6–15 carbon atoms, $R_2$ is an aliphatic, alicyclic or heterocyclic radical containing 3–15 carbon atoms or aromatic hydrocarbon radical containing 6–15 carbon atoms and $R_3$ is a divalent radical obtained proximate equimolar amounts in an inert solvent in which at least one of the reactants is soluble, at a temperature from about −20° C. to below 200° C. until a condensation reaction is substantially completed and thereafter dehydrating the resulting condensation product.

2. The process according to claim 1 which comprises condensing a dianhydride of the formula

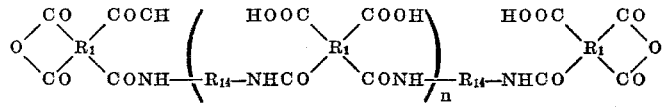

by removal of two $NH_2$ groups from an amine selected from the group consisting of (1) 

wherein A is $-SO_2NH_2$, $-NH_2$, $-OH$ or $-SH$, $R_4$ is an aromatic hydrocarbon radical and bonds (1) and (2) are in vicinal positions, (2) 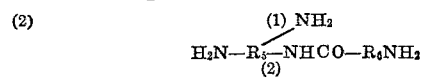

wherein $R_5$ and $R_6$ are each an aromatic hydrocarbon radical and bonds (1) and (2) are in vicinal positions, (3) 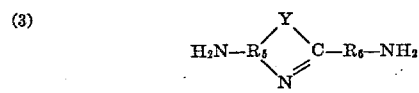

wherein Y is an $-O-$, $-S-$, $-NH$ or $-N-R_{12}$, $R_{12}$ being an aliphatic radical, $R_5$ and $R_6$ are each aromatic radicals, (4) 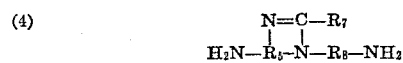

wherein $R_5$ and $R_8$ are each an aromatic hydrocarbon radical $R_7$ is an alkyl radical, (5) 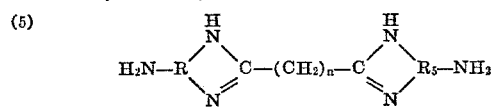

wherein $R_5$ is an aromatic radical and $n'$ is a whole number from 2 to 10 with an amine selected from the group consisting of 1,3-phenylene bis-(p-aminophenyl) ether and mixtures thereof with one of the amines (1)-(5) listed above; condensing said dianhydride and said amine in apwherein $R_{14}$ is the radical of the formula

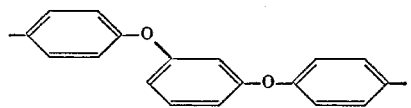

$n$ is a whole number from 0–4 with one or more of polyamines of the Formula 1–5, as defined in claim 1.

3. The process according to claim 1 which comprises reacting the dianhydride of the formula

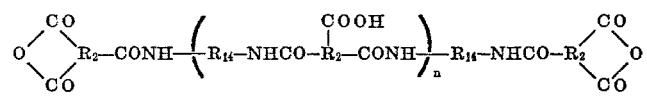

wherein $R_{14}$ is the radical of the formula

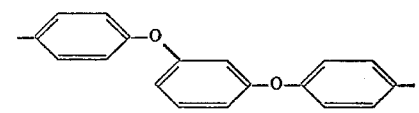

$n$ is a whole number from 0–4, $R_2$ has the meaning assigned in claim 1 with a polyamine of the Formula 1–5 as defined in claim 1.

References Cited

UNITED STATES PATENTS 3,498,948    3/1970    Minami et al. _____ 260—47

WILLIAM H. SHORT, Primary Examiner

L. L. LEE, Assistant Examiner

U.S. Cl. X.R.

260—65, 78 TF